United States Patent Office 3,397,051
Patented Aug. 13, 1968

1

3,397,051
HERBICIDAL CONCENTRATE COMPOSITION
Andrew Stefcik and John P. G. Beiswanger, Easton, Pa., assignors to GAF Corporation, a corporation of Delaware
No Drawing. Filed May 5, 1966, Ser. No. 547,774
8 Claims. (Cl. 71—97)

ABSTRACT OF THE DISCLOSURE

A clear and stable herbicidal composition of matter comprising an aqueous solution containing from 30 to 60 parts by weight of an arsenical compound of the formula $$R_n\text{—ASO.(OH)}_{3-n}$$

and the water soluble ammonium and alkali metal salts of said compound wherein R is a hydrocarbon group selected from the class consisting of saturated hydrocarbon of from 1 to 5 carbon atoms and ethylenic hydrocarbon of from 2 to 3 carbon atoms, $n$ is an integer from 1 to 2, and from 5 to 50 parts by weight of a monophosphate ester of ethoxylated alcohol of the formula $$R_1\text{—}(OCH_2CH_2)_m\text{—O—}\overset{\overset{O}{\parallel}}{P}\genfrac{}{}{0pt}{}{\text{—OH}}{\text{—OH}}$$

and the water soluble ammonium, alkali metal, amine and alkanolamine salts of said monophosphate ester wherein $R_1$ is an alkyl of from 1 to 10 carbon atoms and $m$ is an integer of from 1 to 8.

This invention relates to a herbicidal concentrate composition and particularly to an improved water soluble herbicidal concentrate of aliphatic arsenical compounds having good wetting and penetrating properties.

It is well recognized that weeds and undesirable grasses cause losses of millions of dollars to the agricultural industry. They reduce yields of crops and prevent the efficient use of land. They harbor insects and disease-producing organisms that attack crop plants, clog harvesting equipment, prevent recovery of full harvest and are costly to control. Prior to 1940 inorganic compounds such as copper and iron sulfate, arsenic trioxide and sodium arsenite were employed as herbicides. These compounds are not sufficiently selective and, in fact, are so phytotoxic, that in addition to killing the weeds and undesirable grasses, they also injure or kill desirable crops and ornamental plants. Following the introduction of potassium cyanate, phenyl mercury acetate, 2,4-D, and the like, there was a phenomenal growth in research and production of selective herbicides by the chemical industry. Several dozen effective and selective organic herbicides were made available to farmers and homeowners. Among them are a series of aliphatic arsenical compounds, arsonic acids, arsinic acids and their salts, such as, for example, methylarsonic acid, monosodium acid methyl arsonate, disodium methyl arsonate, monoammonium methyl arsonate, dimethyl arsinic acid, calcium acid methyl arsonate, calcium propyl arsonate and the like, which are easily soluble in water.

The basic fact of this research is that the plant is selective, not the herbicide. The aliphatic arsenical acids and their salts do not magically seek out and destroy the weeds while sparing desirable crops. These compounds are classified as selective weed killers when applied as sprays for pre- and post-emergent control of weeds and grasses such as Johnson grass, nutsedge, goose grass, dallis grass, cocklebur, barnyard grass, foxtail, ragweed, sandbur, crabgrass, puncture vine, and the like, at a temperature of about 80° F. While these aliphatic arsenical acids and

2 their salts are commercially available as aqueous solutions in a concentration ranging from about 30 to about 60%, prior to dilution with water and spray application as a herbicide, it is essential that diluting water contain a specified amount of a mild surfactant such as a liquid dishyashing detergent. As a specific example, an aqueous solution of commercially available monosodium acid methanearsonate of 51.3% concentration requires mixing six pints thereof with 1 to 2 quarts of a mild surfactant in 100 gallons of water. The purpose of the surfactant is to promote the dispersing and wetting properties of the aqueous arsenical herbicide when applied as a spray to the soil or to the growing weeds and undesirable grasses.

The absence of a mild surfactant in the diluting water will cause considerable run-off (no wetting power) of the arsenical herbicidal composition when applied to the soil or weeds or undesirable grasses. While the commercially available aqueous concentrates of the arsenical herbicides are clear and stable at room temperature, they are not stable at temperatures below and above room temperatures. Moreover, the addition of the aqueous concentrate to diluting water containing any of the commercially available surfactants, whether it be anionic, cationic, nonionic, amphoteric, and the like, does not lead to clear and stable solutions. In other words, the indiscriminate selection of a surfactant by the user results in an incompatible mixture that phases out (forms two phases) completely at room temperature and which, as a consequence, does not promote uniform dispersing, wetting and penetration of the herbicidal composition in the soil (pre-emergent) or the wetting of the weed plant and undesirable grasses (post-emergent).

It is the principal object of the present invention to provide clear concentrates of aqueous solutions of aliphatic arsenical acids and their salts as herbicidal compositions which are stable over a wide temperature range and which upon dilution with water have good wetting and penetrating properties.

Other objects and advantages will become manifest from the following description.

We have found that aliphatic arsenical acids and their salts are readily solubilized with monophosphate esters of ethoxylated alcohols to yield clear concentrates which are stable over a wide temperature range and which upon dilution with water and applied as herbicides display excellent wetting and penetrating properties. In preparing such concentrates, the dry aliphatic arsenical acid or salt thereof is dissolved in water to yield a solution of 30 to 60% concentration. In other words, from 30 to 60 parts by weight, on the dry basis, of the aliphatic arsenical acid or salt thereof is dissolved in 70 to 40 parts by weight of water. Gentle heat may be applied to facilitate solution. Since these aliphatic arsenical acids and their salts are commercially available as aqueous solutions in concentrations ranging from 30 to 60%, the monophosphate ester of the ethoxylated alcohol is added in an amount ranging from 5 to 50 parts by weight per 100 parts by weight of the aqueous solution with stirring and the application of gentle heat, if necessary, until a clear solution is obtained. The resulting herbicidal concentrate composition is stable at temperatures ranging from 0° to 100° C. without any loss of clarity or separation of the components constituting the concentrated aqueous mixture. For application of the finished concentrate as a sprayable herbicide, 1 part by volume of the finished concentrate is simply added to 22 parts by volume of water with stirring and applied as a pre-emergent or post-emergent spray for the control and eradication of the weeds and grasses above noted.

We have also found that instead of employing a monophosphate ester of ethoxylated alcohol alone, a mixture of surfactants consisting of from 5 to 45 parts by weight of either an anionic, non-ionic or amphoteric surfactant or blends thereof and from 5 to 50 parts by weight of a monophosphate ester of ethoxylated alcohol may also be employed with the same satisfactory results. The unexpected feature of this finding is that the addition of either an anionic, non-ionic or an amphoteric surfactant alone to the aqueous solution of the aliphatic arsenical acid or salt, or to the diluting water leads to an incompatible mixture that forms two separate phases. Yet, by the presence of at least 5 parts by weight of a monophosphate ester of ethoxylated alcohol in the mixture of surfactants precludes the phase separation when incorporated into the aqueous arsenical herbicide. In employing such mixture of surfactants, from 10 to 95 parts by weight thereof are added to 100 parts by weight of the 30–60% aqueous solution of the aliphatic arsenical acid or salt with stirring until a clear solution is obtained.

The aliphatic arsenicals that are employed in accordance with the present invention are well-known compounds which include the monoaliphatic arsonic acids and di-aliphatic arsinic acids having the following general formula:

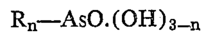

$$R_n\text{—}AsO.(OH)_{3-n}$$

wherein R is an aliphatic hydrocarbon or halo-substituted aliphatic hydrocarbon of from 1 to 5 carbon atoms and $n$ is an integer from 1 to 2.

The monoaliphatic arsonic acids include:

$CH_3AsO(OH)_2$
methylarsonic acid $C_2H_5AsO(OH)_2$
ethylarsonic acid $C_3H_7AsO(OH)_2$
n-propylarsonic acid $C_3H_5AsO(OH)_2$
allylarsonic acid $C_4H_9AsO(OH)_2$
n-butylarsonic acid $C_5A_{11}AsO(OH)_2$
isoamylarsonic acid $CHCl{=}CHAsO(OC)_2$
β-chlorovinylarsonic acid The di-aliphatic arsinic acids include:

$(CH_3)_2AsO.OH$
dimethylarsinic acid $(C_2H_5)_2AsO.OH$
diethylarsinic acid $(C_3H_7)_2AsO.OH$
dipropylarsinic acid $(C_4H_9)_2AsO.OH$
di-n-butylarsinic acid $(C_5H_9)_2AsO.OH$
diisoamylarsinic acid The monoaliphatic arsonic acids are employed as such, as their ammonium, monosodium, monopotassium or calcium salts, or as their disodium or dipotassium salts. The monosodium and monopotassium salts are prepared in the conventional manner by concentrating an aqueous solution of equimolar quantities of the disodium or dipotassium salt and the free acid.

The di-aliphatic acids are also employed as such or as their sodium or potassium salts, such as, for example, sodium or potassium di-aliphatic arsinates having the formula $R_2AsO_2X.3H_2O$ wherein $R_2$ is di-aliphatic and X is either sodium or potassium.

The monophosphate esters of ethoxylated alcohols employed as an essential constituent of the herbicidal concentrate compositions of the present invention are characterized by the following general formula:

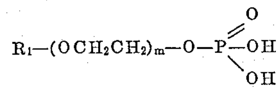

$$R_1\text{—}(OCH_2CH_2)_m\text{—}O\text{—}P(=O)(OH)\text{—}OH$$

wherein $R_1$ is an alkyl of from 1 to 10 carbon atoms and $m$ is an integer from 1 to 8. They are readily obtained by phosphating one mole of a nonionic surface active agent, having the molecular configuration of a condensation product of from 1 to 8 moles of ethylene oxide with one mole of an aliphatic primary alcohol of from 1 to 10 carbon atoms, with one mole of $P_2O_5$ as present in 110%–120% polyphosphoric acid at a temperature ranging from about room temperature to about 145° C. A small amount of hypophosphorous acid, or its salt, may be used for color inhibition during the reaction. In lieu of the condensation product of ethylene oxide and aliphatic primary alcohol, one mole of an ethyleneglycol monoalkyl ether, wherein the alkyl contains from 1 to 6 carbon atoms such as ethyleneglycol-monomethyl ether, -monoethyl ether, -monopropyl ether, -monobutyl ether, -monoamyl ether and -monohexyl ether, may be phosphated with one mole of $P_2O_5$ in 110%–120% polyphosphoric acid under the same conditions to yield the monophosphate esters.

For the purpose of the present invention, it is preferred that prior to phosphation, the condensation product of ethylene oxide and the aliphatic primary alcohol be in the following mole ratios:

| One mole of alcohol: | Moles of ethylene oxide |
|---|---|
| Methanol | 1–2 |
| Ethanol | 1–2 |
| Propanol | 1–2 |
| Butanol | 1–2 |
| Pentanol | 2–4 |
| Hexanol | 2–4 |
| Heptanol | 2–5 |
| Octanol | 5 |
| Isooctanol | 5 |
| Nonanol | 6–7 |
| Decanol | 7–8 |

It is to be noted that the product of the above phosphation reaction is essentially a mixture containing from about 80% to about 90% of monoester with small amounts of diester and small amounts of unreacted ethoxylated alcohol or unreacted ethyleneglycol monoalkyl ether. From the results of our experimentation with the present invention, we found that such mixture is as efficient as the 100% monophosphate ester which may be isolated from the mixture by solvent extraction or by passing through a column of ion exchange resins. The monophosphate esters may be employed as such or as their water soluble salts such as, for example, ammonium, potassium, sodium, organic amine salts, alkanolamine salts, and the like.

The product of the above phosphation reaction, or a water soluble salt thereof, may be further mixed with water and a lower aliphatic alcohol to yield a mixture which may be incorporated into the aqueous solution of the aliphatic arsenical compound to give the desired herbicidal concentrate. This mixture may consist of the following components:

| Component: | By weight, percent |
|---|---|
| Product of above phosphation reaction as such or water soluble salt thereof | 50 |
| Aliphatic alcohol of 1 to 4 carbon atoms | 20 |
| Water | 30 |

In lieu of 5–50 parts by weight of the pure monophosphate ester, or of the above phosphation reaction product or water soluble salt thereof, 10 to 100 parts by weight of the foregoing three component mixture may be used for incorporation into the aqueous aliphatic arsenical compound to give the desired herbicidal concentrate.

Further details of the above phosphation reaction will be found in the pending application of Fred S. Eiseman, Jr., and Leslie M. Schenck, Ser. No. 396,700, filed Sept. 15, 1964, now United States Patent 3,331,896, issued July 18, 1967, the entire specification of which is incorporated herein by reference thereto.

The surfactants, i.e., anionic, cationic, nonionic and amphoteric, that are mixed in the ratio of 5 to 45 parts by weight with 5–50 parts by weight of a monophosphate ester of the above formula or the water soluble salt thereof include the following series of compounds:

ANIONIC (ANION-ACTIVE COMPOUNDS)

Products obtained by the sulfonation of fatty esters, sulfonated derivatives of polyvalent alcohols, products obtained by esterification of fatty acids with sulfonated monovalent alcohols, products obtained by sulfonation of fatty amides, products obtained by condensation of fatty acid chlorides with amines, products obtained by sulfonation of natural and synthetic alcohols having six or more carbon atoms to yield sodium salts of sulfuric esters, R—O—$SO_3Na$, or alkali sulfonates, R—$SO_3Na$; alkylaryl sulfonates, sulfonated products of ethoxylated alkylphenols, sulfuric acid derivatives of amides, numerous species of which are illustrated in U.S. Patent 1,932,180; ester-ethanesulfonic acids of the formula $$HO_3S.C_2H_4O.OC.R$$

wherein R is an aliphatic hydrocarbon of at least 3 carbon atoms, numerous species of which are illustrated in U.S. Patent 1,881,172; water and alkali soluble anionics illustrated in U.S. Patents 2,454,542; 3,004,056; 3,004,057; and 3,235,627; esters of sulfonated fatty acids; sulfonated natural fatty acids, and the like.

NONIONIC

Condensation products of fatty alcohols or fatty acids with ethylene oxide, polyethyleneglycols, glycols and polyglycol ethers of isocyclic hydroxy compounds, numerous species of which are disclosed in U.S. Patent 2,213,447; ethoxylated di-alkyl-phenols, numerous species of which are illustrated in U.S. Patent 2,593,112; water soluble ethoxylated alcohols, ethoxylated carboxylic acids and amino compounds, numerous species of which are disclosed in U.S. Patent 1,970,578.

Of the foregoing non-ionics, we prefer to employ those in the following list which are readily available and pricewise more economical. In this list, "E.O." signifies "ethylene oxide" and the number preceding the same refers to the number of moles thereof reacted with one mole of the given reactive hydrogen containing compound:

Nonylphenol+9–11 E.O.
Dinonylphenol+7 E.O.
Dodecylphenol+18 E.O.
Castor oil+20 E.O.
Tall oil+18 E.O.
Oleyl alcohol+20 E.O.
Lauryl alcohol+4 E.O.
Lauryl alcohol+15 E.O.
Hexadecyl alcohol+12 E.O.
Hexadecyl alcohol+20 E.O.
Octadecyl alcohol+20 E.O.
Oxo tridecyl alcohol:
 (from tetrapropylene)+7 E.O.
 (from tetrapropylene)+10 E.O.
 (from tetrapropylene)+15 E.O.
Dodecyl mercaptan+9 E.O.
Soya bean oil amine+10 E.O.
Rosin amine+32 E.O.
Cocoanut fatty acid amine+7 E.O.
Cocoa fatty acid+10 E.O.
Dodecylbenzene sulfonamide+10 E.O.
Decyl sulfonamide+6 E.O.
Oleic acid+5 E.O.
Polypropylene glycol (30 oxypropylene units)+10 E.O.

The nonionic surfactants of the above list may be employed as such or as their sulfated derivatives.

AMPHOTERIC

Metal salts of substituted quaternary hydroxy cycloimidinic acid metal alcoholate, numerous species of which are illustrated in U.S. Patent 2,528,378, especially the product available under the brand name of "Miranol H.M." which is 2-alkyl (from cocoanut fatty acid)-1-(2-hydroxy-ethyl)-1-carboxymethyl - 2 - imidazolinium hydroxide, sodium salt; the amphoteric surfactants disclosed in Swiss Patent 234,350, British Patent 582,092, and the like.

CATIONIC

Aliphatic (fatty) amines and their derivatives, fatty amides derived from aliphatic diamines, quaternary ammonium compounds, amides derived from amino alcohols and their quaternary ammonium derivatives, quaternary ammonium bases of the benzimidazolines, dimethylphenylbenzyl ammonium chloride, polyethylene diamines and their quaternary ammonium derivatives, polypropanol-polyethanolamines; especially, hexadecylamine hydrochloride, water soluble salts of undecylimidazoline, "Sapamine CH," triethyl cetyl ammonium chloride, dimethylbenzyldodecyl ammonium chloride, sulfate of lauryl pyridinium, quaternized ethoxylated alkyl amines (Katapone VV328), ethoxylated amines (Katapol PN430), ethoxylated alkylolamides, and the like.

The following examples will describe in detail the methods for accomplishing the above objects. It is to be understood, however, that these examples are inserted merely for the purpose of illustration and are not to be construed as limiting the scope of the invention. The parts are by weight unless otherwise noted.

Example 1

To 100 parts of an aqueous solution containing 51.3% of monosodium acid methanearsonate there were added with stirring at room temperature 30 parts of the monophosphate ester obtained by phosphating one mole of monoethoxylated butanol with one mole of polyphosphoric acid containing 2.5 moles of $P_2O_5$. The resulting clear solution was stored at 0° for 24 hours and then placed into an oven and kept for 24 hours at 100° C. It was observed that at both temperatures, i.e., 0° and 100° C., the solution was clear with no separation of the components. It is readily dilutable with all proportions of water yielding a clear solution.

Example 2

To 100 parts of an aqueous solution containing 34.18% of methyl arsonic acid, there were added 35 parts of the monophosphate ester obtained by phosphating one mole of tetraethoxylated isoamyl alcohol with one mole of polyphosphoric acid containing 2.5 moles $P_2O_5$. During the addition, the solution was stirred until clear. After being subjected to the low and high temperatures, as in Example 1, the solution remained clear and the components therein did not separate. The resulting concentrate was dilutable with water in all proportions yielding a clear solution.

Example 3

30 parts of calcium propyl arsonate were dissolved in 70 parts of water. To 100 parts of the resulting aqueous solution, there were added 20 parts of a mixture consisting of 50 parts of the monophosphate ester of monoethoxylated butanol, 20 parts of butanol and 30 parts of water. The resulting clear solution was stable without phase separation, both at 0° and 100° C., for a period of time of 24 hours for each. The resulting concentrate was readily dilutable in all proportions of water.

Example 4

To 100 parts of an aqueous solution containing 60% of monoammonium methyl arsonate, there were added 30 parts of the monophosphate ester of pentaethoxylated isooctanol. The resulting solution was clear both at 0° and 100° C. without separation of any of the components. The resulting concentrate was dilutable in all proportions of water yielding a clear solution.

Example 5

To 100 parts of an aqueous solution containing 60% of monosodium acid methyl arsonate, there were added 40 parts of the product obtained by the condensation of one mole of nonyl phenol with 10 moles of ethylene oxide and 27 parts of the monophosphate ester of ethylene glycol monobutyl ether. After stirring, the resulting solution was clear and remained clear without separation of the components for at least 10 cycles of freeze-thaw (each cycle consisting of 16 hours at −35° C. and 8 hours at 30° C.). The resulting herbicidal concentrate was dilutable in all proportions of water yielding clear solution.

Example 6

35 parts of dimethyl arsinic acid were dissolved in 65 parts of water with gentle heating to yield a clear solution. To 100 parts of the resulting solution, there were added 10 parts of the monophosphate ester of heptaethoxylated decanol. After stirring at room temperature, there was obtained a clear solution, which was stable and did not separate into its components, both at the 0° and 100° C. temperature range during the 24-hour storage. The resulting concentrate was readily dilutable in all proportions of water yielding a clear solution.

Example 7

To 77 parts of aqueous solution containing 51.2% monosodium methane arsonate, there were added 19 parts of 2-alkyl (from cocoanut fatty acid) - 1 - (2 - hydroxy - ethyl) - 1 - carboxymethyl - 2 - imidozolenium hydroxide, sodium salt and 4 parts of the monophosphate ester obtained by phosphating 1 mole of monoethoxylated butanol with one mole of polyphosphoric acid containing 2.5 moles $P_2O_5$. The resulting concentrate was clear and readily dilutable in all proportions with water yielding a clear solution.

Example 8

To 65 parts of aqueous solution containing 50% monosodium methane arsonate, there were added with stirring at room temperature 20 parts sulfonated fatty acid (Prestabit Oil V) and 15 parts of the monophosphate ester obtained by phosphating 1 mole of monoethoxylated butanol with one mole of polyphosphoric acid containing 2.5 moles of $P_2O_5$. The resulting clear concentrated solution stored at 0° C. and 100° C. for 24 hours each remained clear. Its penetrating and wetting power were excellent as shown by a Draves Wetting Time of 9 seconds for a 1% dilution.

Example 9

To 54 parts of solution containing 51.2% monosodium methane arsonate, there were added with stirring at room temperature 32 parts of a product obtained by the condensation of one mole of nonyl phenol with 10 moles ethylene oxide and 14 parts of the monophosphate ester obtained by phosphating 1 mole of monoethoxylated butanol with one mole of polyphosphoric acid containing 2.5 moles of $P_2O_5$. A clear concentrated solution resulted. It is readily dilutable with all proportions of water yielding a clear solution with strong wetting action as indicated by a Draves Wetting Time of 1 second for a 1% dilution in water.

The monophosphate esters of ethoxylated alcohols as such, or mixtures thereof with anionic, cationic, nonionic and amphoteric surfactants, employed in accordance with the present invention, may also be added to diluting water for herbicidal compositions to impart good dispersing, wetting, and penetrating properties.

They may also be added in the same proportions, as noted above, to the concentrated solutions and dispersions of such herbicidal compositions as well as of various insecticidal and fungicidal compositions, including the diluting water.

In connection with the anionic, cationic, nonionic and amphoteric surfactants referred to above, it is to be clearly understood that their chemical configuration is immaterial so long as they are soluble in water. In other words, all water soluble anionic, cationic, nonionic and amphoteric surfactants as such, or mixtures thereof, may be mixed with the monophosphate esters of ethoxylated alcohols in the aforementioned proportions.

We claim:

1. A herbicidal composition of matter comprising an aqueous solution containing from 30 to 60 parts by weight of an arsenical compound of the formula:

$$R_n\text{—ASO.(OH)}_{3-n}$$

and the water soluble ammonium and alkali metal salts of said compound wherein R is an acyclic hydrocarbon selected from the class consisting of saturated hydrocarbon of from 1 to 5 carbon atoms and ethylenic hydrocarbon of from 2 to 3 carbon atoms, $n$ is an integer from 1 to 2, and from 5 to 50 parts by weight of a monophosphate ester of ethoxylated alcohol of the formula:

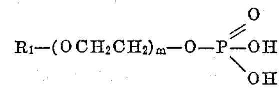

and the water soluble ammonium, alkali metal, amine, and alkanolamine salts of said monophosphate ester wherein $R_1$ is an alkyl of from 1 to 10 carbon atoms and $m$ is an integer from 1 to 8.

2. A herbicidal composition of matter consisting of an aqueous solution containing from 30 to 60 parts by weight of an arsenical compound of the formula:

$$R_n\text{—ASO.(OH)}_{3-n}$$

and the water soluble ammonium, alkali metal salts of said compound wherein R is an acyclic hydrocarbon selected from the class consisting of saturated hydrocarbon of from 1 to 5 carbon atoms and ethylenic hydrocarbon of from 2 to 3 carbon atoms, $n$ is an integer from 1 to 2, and from 10 to 95 parts by weight of a mixture of surfactants consisting of from 5 to 50 parts by weight of a monophosphate ester of ethoxylated alcohol of the formula:

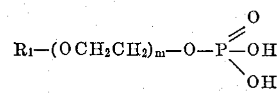

and the water soluble ammonium, alkali metal, amine, and alkanolamine salts of said monophosphate ester wherein $R_1$ is an alkyl of from 1 to 10 carbon atoms and $m$ is an integer from 1 to 8, and from 5 to 45 parts by weight of a surfactant selected from the class consisting of anionic, cationic, non-ionic, and amphoteric surfactants.

3. A herbicidal composition of matter according to claim 1 wherein the water soluble salt of the arsenical compound is monosodium acid methane arsonate.

4. A herbicidal composition of matter according to claim 1 wherein the water soluble salt of the arsenical compound is monoammonium methylarsonate.

5. A herbicidal composition of matter according to claim 1 wherein the water soluble salt of the arsenical compound is calcium propyl arsonate.

6. A herbicidal composition of matter according to claim 1 wherein the arsenical compound is dimethyl arsinic acid.

7. A herbicidal composition according to claim 1 wherein the monophosphate ester of ethoxylated alcohol is the monophosphate ester of monoethoxylated butanol.

8. A herbicidal composition of matter according to claim 2 wherein the mixture of surfactants consists of 40 parts by weight of the product obtained by the condensation of nonyl phenol with 10 moles of ethylene oxide and 27 parts by weight of monophosphate ester of ethyleneglycol monobutyl ether.

References Cited

UNITED STATES PATENTS

| | | | |
|---|---|---|---|
| 2,678,265 | 5/1954 | Schwerdle | 71—97 |
| 3,169,850 | 2/1965 | Thompson | 71—97 |
| 3,254,982 | 6/1966 | Renner | 71—97 |
| 3,331,896 | 7/1967 | Eiseman et al. | 260—980 |

OTHER REFERENCES

McCutcheon "Detergents and Emulsifiers" p. 12 (1963).

LEWIS GOTTS, *Primary Examiner.*

G. HOLLRAH, *Assistant Examiner.*